United States Patent
Bowden

[15] 3,642,259
[45] Feb. 15, 1972

[54] AUTOMOBILE EXHAUST FILTER

[72] Inventor: Carl L. Bowden, 240 N. Ninth Ave., Oakdale, Calif. 95361

[22] Filed: July 23, 1969

[21] Appl. No.: 843,938

[52] U.S. Cl.................................261/122, 55/250, 55/259, 55/DIG. 30, 60/30 L, 60/32, 261/123
[51] Int. Cl.........................................................B01d 47/02
[58] Field of Search................55/210, 250, 257, 259, 316, 55/DIG. 30; 60/30, 32, 99; 261/121, 122, 123

[56] References Cited

UNITED STATES PATENTS

| | | | |
|---|---|---|---|
| 1,622,692 | 3/1927 | Wendling | 55/DIG. 30 |
| 1,782,890 | 11/1930 | Elliott et al. | 261/121 X |
| 1,926,433 | 9/1933 | Cartmell | 55/250 |
| 1,968,698 | 7/1934 | Meyer | 261/122 |
| 2,116,718 | 5/1938 | Stubbs | 60/32 X |
| 3,214,902 | 11/1965 | Maring | 60/32 X |
| 3,224,171 | 12/1965 | Bowman | 60/32 X |
| 3,383,854 | 5/1968 | White | 55/DIG. 30 |
| 3,391,521 | 7/1968 | Pal | 60/30 L |
| 3,417,549 | 12/1968 | Leosts | 55/316 |
| 3,516,647 | 6/1970 | Jaffee et al. | 261/122 X |

FOREIGN PATENTS OR APPLICATIONS

| | | | |
|---|---|---|---|
| 808,806 | 2/1959 | Great Britain | 55/DIG. 30 |

Primary Examiner—Tim R. Miles
Assistant Examiner—Steven H. Markowitz
Attorney—Clarence A. O'Brien and Harvey B. Jacobson

[57] ABSTRACT

A housing including an inlet opening and an outlet opening and adapted to be interposed in an exhaust system, such as an automotive exhaust system, and including internal baffles defining a tortuous passage extending therethrough from the inlet to the outlet. The housing further includes a liquid sump through which gases moving through the housing must pass as well as a filter body of activated charcoal or the like through which the gases must also pass. In one form of the invention exhaust gases are drawn through the housing by a vehicle motor-driven vacuum pump and in a second form an electric motor-driven vacuum pump is disposed within the outlet end of the housing for drawing the exhaust gases through the housing. In the first and second form, a vacuum relief valve is disposed upstream from the liquid sump for relieving excess reduction of gas pressures above the sump.

6 Claims, 6 Drawing Figures

PATENTED FEB 15 1972 3,642,259

Carl L. Bowden
INVENTOR.

BY Clarence A. O'Brien
and Harvey B. Jacobson
Attorneys

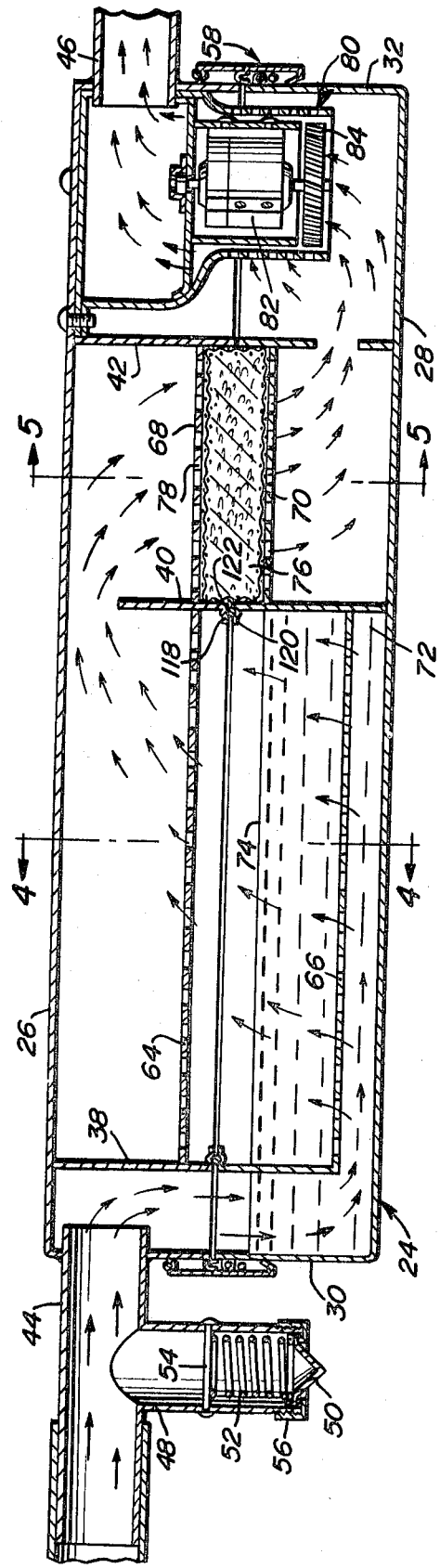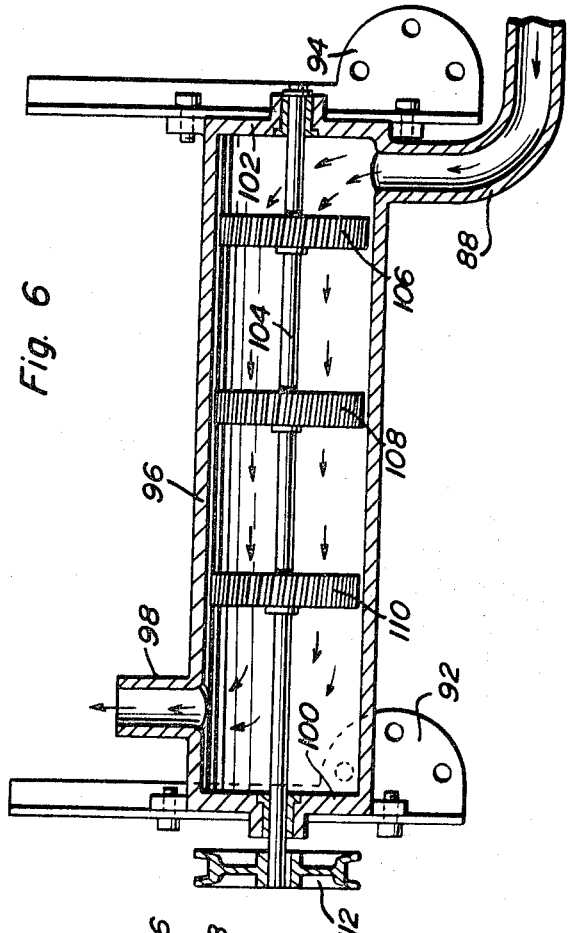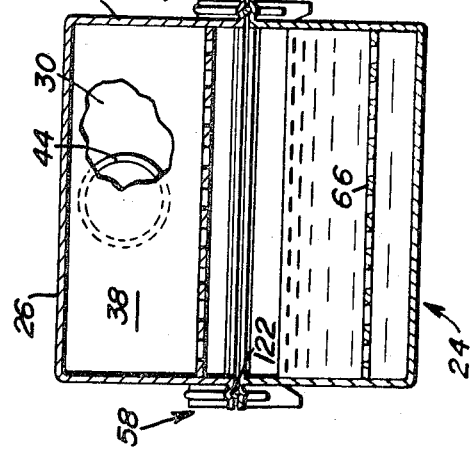

3,642,259

AUTOMOBILE EXHAUST FILTER

The exhaust gas filter of the instant invention has been primarily designed for use on automobiles and serves the function of washing automotive exhaust gases, oxidizing carbon monoxide components of exhaust gases and absorbing various undesirable gaseous portions of automotive exhaust gases.

However, it is to be noted that the exhaust gas filter of the instant invention may also be utilized for filtering other exhaust gases such as those discharged from industrial smokestacks and the like.

The filter of the instant invention includes means for simultaneously washing the exhaust gases, oxidizing at least a portion of the carbon monoxide present in the gases and also absorbing various undesirable gaseous portions of exhaust fumes by passing the exhaust fumes through a liquid bath containing oxidizing and absorption agents. Secondly, the filter of the instant invention includes a filter barrier of activated charcoal through which the washed gases must pass and which serves to further absorb undesirable gaseous components of the exhaust fumes. Thereafter, the exhaust fumes are passed outwardly of the filter outlet for discharging in the ambient atmosphere or at least partial reintroduction of the cleansed exhaust fumes into the air-and-fuel inlet of the associated combustion engine.

The main object of this invention is to provide an exhaust gas filter which will be capable of functioning in a manner to greatly reduce the carbon monoxide content of combustion exhaust fumes as well as greatly reduce the solid particle content of exhaust fumes.

Another object of this invention is to provide an exhaust gas filter specifically adapted for use on automobiles and other vehicles propelled by combustion engines, but which will also be effective in filtering other combustion exhaust fumes such as those discharged from an industrial smokestack.

Yet another object of this invention is to provide an exhaust gas filter in accordance with the preceding objects and constructed in a manner whereby the liquid bath therein and filter components thereof may be readily cleaned and/or replaced when desired.

Another object of this invention is to provide a device in accordance with the preceding objects which will serve to greatly reduce the temperature of combustion exhaust fumes.

A further object of this invention is to provide a filter assembly which may be readily constructed of a size small enough to comprise a replacement for a conventional automotive muffler and yet which will have sufficient capacity so as not to adversely affect the operation of an associated automotive engine.

A final object of this invention to be specifically enumerated herein is to provide an automobile exhaust gas filter in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

FIG. 1 is a fragmentary schematic side elevational view of the forward end of a conventional form of motor vehicle with the exhaust filter of the instant invention interposed within the exhaust system of the engine of the vehicle in place of the usual muffler portion of the exhaust system and with an alternate mode of operation of the filter represented by a phantom line representation of a flexible conduit leading from the outlet of the filter to the inlet of an engine driven vacuum pump;

FIG. 3 is an enlarged longitudinal vertical sectional view taken substantially upon a plane passing through the longitudinal centerline of the filter;

FIG. 4 is a transverse vertical sectional view taken substantially upon the plane indicated by the section line 4—4 of FIG. 3;

FIG. 6 is a fragmentary enlarged sectional view taken substantially upon a plane passing through the center of the engine driven vacuum pump illustrated in FIG. 1.

Figure 1:
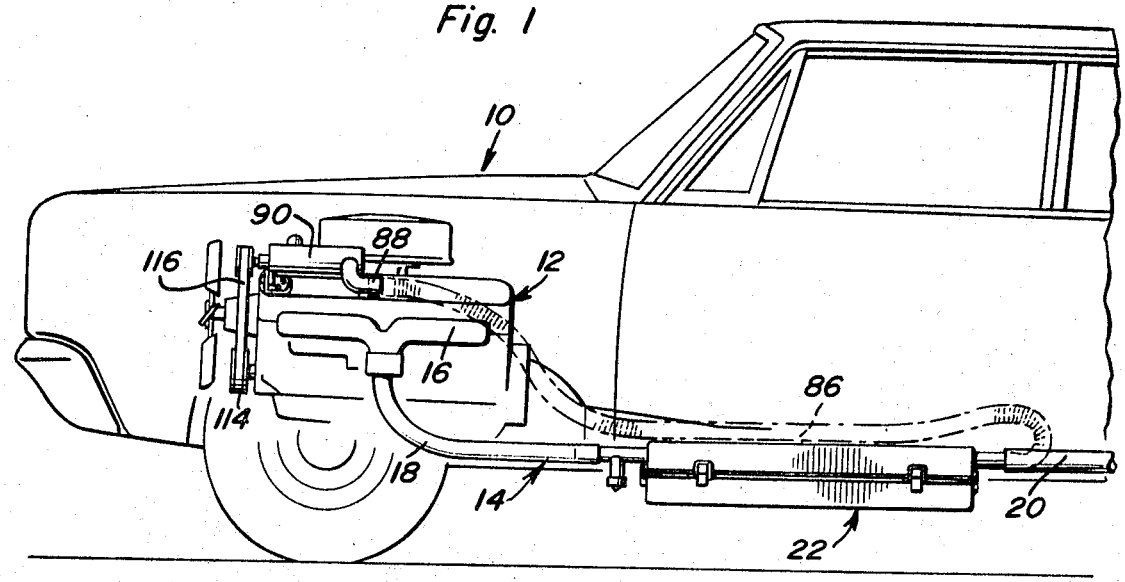
Figure 2:
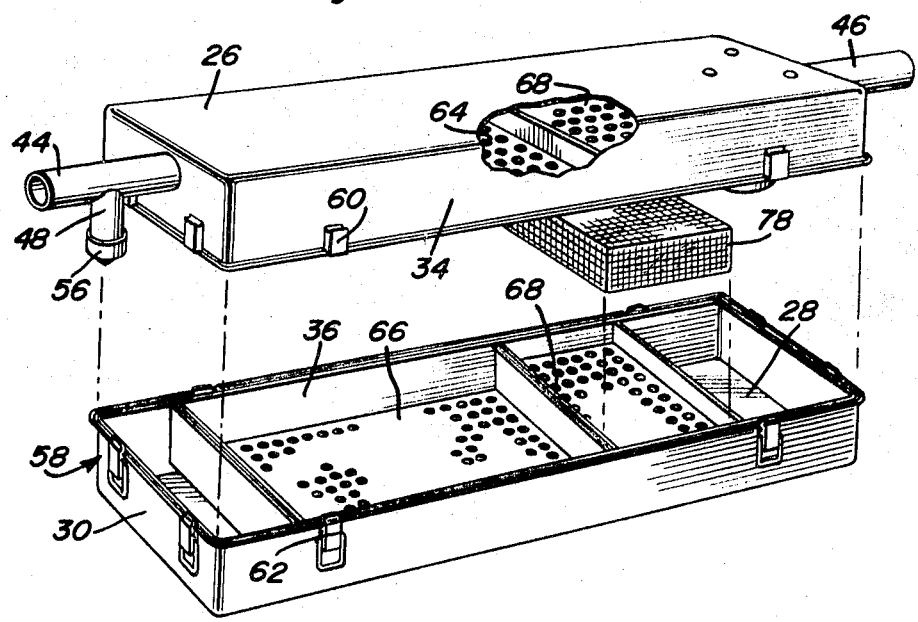
FIG. 2 is an exploded perspective view of the filter.
Figure 5:
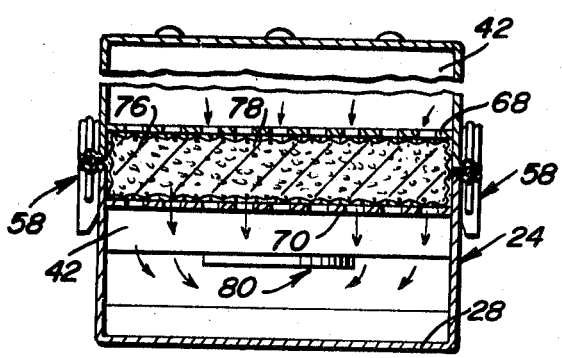
FIG. 5 is a transverse vertical sectional view taken substantially upon the plane indicated by the section line 5—5 of FIG. 3.

Referring now more specifically to the drawings, the numeral 10 generally designates a conventional form of motor vehicle including an internal combustion engine 12 provided with an engine exhaust system referred to in general by the reference numeral 14. The exhaust system 14 includes an exhaust manifold 16, a header pipe 18 for ducting exhaust gases from the exhaust manifold and a tailpipe 20 whose inlet end is spaced rearward of the outlet end of the header pipe 18.

Normally, a conventional automotive muffler is interposed between the outlet end of the header pipe 18 and the inlet end of the tailpipe 20. However, the filter of the instant invention is referred to in general by the reference numeral 22 and is interposed between the header pipe 18 and the tailpipe 20 in lieu of the conventional muffler and includes an elongated generally rectangular housing referred to in general by the reference numeral 24. The housing 24 includes top and bottom walls 26 and 28, front and rear walls 30 and 32, and opposite sidewalls 34 and 36.

The housing 24 includes first, second and third upstanding transverse partitions 38, 40 and 42 which extend between the sidewalls 34 and 36 and it may be seen from FIG. 3 of the drawings that the partitions 38 and 42 project downwardly from the top wall 26 and terminate a spaced distance above the bottom wall 28. On the other hand, the partition 40 projects upwardly from the bottom wall 28 and terminates a spaced distance below the top wall 26.

The front wall 30 has a forwardly projecting inlet neck 44 opening therethrough and the rear wall 32 includes a rearwardly projecting outlet neck 46 which is secured therethrough. Therefore, it may be seen that exhaust gases entering the inlet neck 42 and being discharged from the outlet neck 46 must pass through a tortuous passage extending through the housing 24 and defined by the partitions 38, 40 and 42.

The remote ends of the necks 44 and 46 are telescoped within the discharge and inlet ends of the header pipe 18 and tailpipe 20, respectively, and any suitable means may be utilized to establish a reasonably fluidtight seal between the header and tailpipes 18 and 20 and the inlet and outlet necks 44 and 46. Also, from FIG. 3 of the drawings it may be seen that the inlet neck includes a supplemental air inlet tube 48 opening into the inlet neck at its inner end and having a spring-biased valve member 50 controlling its outer inlet end. The valve member 50 is maintained under the biasing action of a compression spring 52 held captive within the supplemental air inlet 48 between an abutment pin 54 and an adjustable threaded cap 56 threadedly engaged on the outer end of the supplemental air inlet 48. Accordingly, it may be seen that the supplemental air inlet comprises a vacuum relief valve which may be adjusted by rotating the cap 46 as desired.

The housing 14 is constructed of downwardly and upwardly opening upper and lower halves removably joined together by means of a pair of overcenter toggle latch assemblies generally referred to by the reference numerals 58 supported from each of the walls 30, 32, 34 and 36. Each of the walls 30, 32, 34 and 36 includes upper and lower sections upon which the upper and lower components 60 and 62 of the corresponding latch assemblies are secured. Further, the partitions 38, 40 and 42 include portions thereof supported from both the upper and lower halves of the housing 24 and the walls 30, 32, 34 and 36 as well as the partitions 38, 40 and 42 include opposing edge portions which are disposed in a common plane when the upper and lower halves of the housing 24 are secured together.

A pair of vertically spaced upper and lower foraminous horizontal partitions 64 and 66 are secured between the upper and lower portions of the first and second partitions 38 and 40 and a pair of vertically spaced upper and lower apertured panels 68 and 70 are secured and extend between the upper and lower portions of the second and third partitions 40 and 42.

A suitable liquid such as water 72 is disposed within the lower half of the housing 24 between the lower portion of the front wall 30 and the lower portion of the partition 40. The level 74 of the water 72 is spaced slightly below the upper extremities of the lower half of the housing 24 and the water 72 has a permanganate and soda lime dissolved therein. Further, a filter body 76 of activated charcoal contained within a wire mesh envelope 78 is disposed between the panels 68 and 70. Accordingly, exhaust gases passing through the housing 24 are first washed in the water 72 and have a portion of the carbon monoxide therein oxidized by the permanganate. Further, the exhaust gases are also purged of undesirable gaseous components thereof by absorption by the soda lime dissolved in the water 72. The washed gases then pass through the activated charcoal 76 and beneath the partition 42 into the end chamber at the discharge end of the housing 24.

A motor and vacuum pump assembly referred to in general by the reference numeral 80 is removably supported from the top wall 26 within the outlet end chamber of the housing 24 and the assembly 80 includes an electric motor 82 having a turbine wheel 84 mounted on its output shaft. The assembly 80 is operative to draw exhaust gases thereinto and to discharge the exhaust gases from the outlet neck 46. The motor 82 may be powered from a storage battery provided in the vehicle 10. It is to be understood that the assembly 80 will be of sufficient capacity to reduce the pressure above the water 72 to the point whereby the exhaust gases entering the inlet 44 will be drawn through the water 72 without an experience of excess back pressures upstream from the water 72.

From FIG. 1 of the drawings it may be seen that the tailpipe 20 may be removed and that a flexible pipe 86 may be utilized to duct the discharge from the filter 22 to the inlet neck 88 of a vacuum pump 90 which may be utilized in lieu of the assembly 80. When the vacuum pump 90 is utilized, the assembly 80 may be removed from within the chamber at the discharge end of the housing 24 and the vacuum pump 90 is supported from the engine 12 by means of suitable mounting brackets 92 and 94 secured to the casing 96 of the vacuum pump 90 which also includes an outlet 98.

The vacuum pump casing 96 includes opposite end walls 100 and 102 from which the opposite ends of a shaft 104 are journaled. The casing 96 is cylindrical and a plurality of turbine wheels 106, 108 and 110 are mounted on the shaft 104 for rotation therewith at points spaced longitudinally therealong. The forward end of the shaft 104 which projects through the end wall 104 is extended and has a drive pulley 112 mounted thereon. The drive pulley 112 is aligned with the crankshaft pulley 114 of the combustion engine 12 and an endless flexible belt 116 drivingly connects the crankshaft pulley 114 to the drive pulley 112 of the vacuum pump 90. Accordingly, it may be seen that the vacuum pump 90 will perform all of the functions of the assembly 80 when the vacuum pump 90 is utilized in lieu of the assembly 80.

The confronting surfaces of the upper and lower portions of the partitions 38 and 40 include inwardly projecting grooved flanges 118 and 120 between which a neoprene seal 122 is disposed and the portions of the upper and lower sections of the sidewalls 34 and 36 extending between the partitions 38 and 40 include flanges 124 and 126 corresponding to the flanges 118 and 120 between which the seal 122 is also disposed. Therefore, the portions of the liquid bath defined by the water 72 upwardly through which the exhaust gases are bubbled is sealed against loss of water.

Of course, it is appreciated that the heat of the exhaust gases will cause some of the water to be vaporized and to be carried out of the outlet neck 46 with the exhaust gases. In addition, the tendency of vaporization of the water 72 is further increased by operation of the assembly 80 as well as operation of the vacuum pump 90 when the latter is utilized in lieu of the assembly 80. However, the exhaust gases passing through the filter 22 are appreciably reduced in temperature and considerable quantities of water in vapor form entering the filter 22 through the inlet neck 44 are condensed out of the exhaust gases and therefore replace any water which is lost by vaporization of the water 72.

When the pump 90 is utilized, it is highly possible that high-speed downhill coasting of the vehicle 10 will result in appreciable vacuum being built-up above the water 72 downstream from the partition 38. This of course would cause considerably greater quantities of water 72 to be vaporized. Accordingly, the inlet neck 44 is provided with the vacuum relief valve member 50 wherein any tendency of excess vacuum to buildup above the water 72 downstream from the partition 38 will result in the valve 50 being opened and supplemental air being drawn into the inlet neck 44 to relieve such excess vacuum.

When servicing the filter 22, the lower portion of the housing 24 may be readily removed by releasing the upper and lower components 60 and 62 of the assemblies 58. Then, the water 72 may be changed and the compartments in which the water is received may be cleaned. Further, the filter body 76 may be replaced if desired and the assembly 80 may be readily serviced from below before the lower half of the housing 24 is again secured to the upper half of the housing 24.

The housing 24 may be constructed of any suitable material resistant to corrosion and heat. Further, oxidizing and absorption agents other than permanganate and soda lime may be used in the water 72, if desired. Also, the electric motor 82 will be of a sealed type.

In addition to the filter 22 being operative to cleanse engine exhaust gases and to oxidize carbon monoxide as well as absorb other undesirable gaseous components of exhaust fumes, it may also have crankcase vapors of the associated internal combustion engine passed therethrough, whereby other more expensive means of reducing contaminants resulting from the crankcase vapors may be eliminated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A housing including an inlet opening and an outlet opening and adapted to be interposed in an exhaust system, said housing including internal baffle means defining a tortuous passage extending therethrough from said inlet to said outlet and a wet sump intermediate the opposite ends of said passage through which gases moving through said passage are forced to be bubbled, said housing being elongated and including top and bottom walls, said inlet and outlet openings opening into upper portions of the opposite ends of said housing, said baffle means including first, second and third transverse baffles disposed in said housing intermediate its opposite ends and spaced longitudinally of the housing from the inlet end to the outlet end thereof, said first and third baffles extending downwardly from the upper wall of said housing and terminating above the bottom wall thereof and said second baffle projecting upwardly from the bottom wall and terminating below the top wall, said sump being defined between the inlet end of said housing and said second baffle, said first baffle extending downwardly below the liquid level of said sump, said housing being constructed in upper downwardly and lower upwardly opening halves removably secured together, vertically spaced upper and lower horizontal apertured panels extending between the said second and third partitions, and filter material disposed between said panels, said upper and lower panels being supported from said upper and lower halves, respectively.

2. The combination of claim 1 including a combustion engine having an exhaust system in which said housing is interposed, and including a vacuum pump driven from said combustion engine.

3. The combination of claim 1 wherein said filter material comprises activated charcoal.

4. The combination of claim 1 wherein said partitions each include upper and lower portions supported from said upper and lower halves, respectively.

5. The combination of claim 4 including vertically spaced upper and lower foraminous horizontal partitions extending between the upper portions of said first and second partitions with the lower partition spaced below said liquid level and the upper partition spaced above said liquid level, said upper and lower horizontal partitions being supported from said upper and lower halves, respectively.

6. The combination of claim 1 including a vacuum pump operatively associated with said outlet for creating a reduced pressure in said housing downstream from said wet sump, and a vacuum relief valve communicating with said passage upstream from said sump for relieving excess reduction of gas pressure downstream from said wet sump, said vacuum pump being disposed in said housing immediately upstream from said outlet opening, said vacuum pump being supported from said upper half.

* * * * *